(12) United States Patent
Hatalsky et al.

(10) Patent No.: US 6,243,143 B1
(45) Date of Patent: Jun. 5, 2001

(54) EFFECTING VIDEO TRANSITIONS BETWEEN VIDEO STREAMS

(75) Inventors: Jeffrey F. Hatalsky, Framingham; John R. Fierke, Hopkinton, both of MA (US)

(73) Assignee: Media 100 Inc., Marlborough, MA (US)

( * ) Notice: Subject to any disclaimer, the term of this patent is extended or adjusted under 35 U.S.C. 154(b) by 0 days.

(21) Appl. No.: 09/400,372

(22) Filed: Sep. 21, 1999

(51) Int. Cl.$^7$ ...................................... H04N 9/74
(52) U.S. Cl. ........................ 348/584; 348/590; 348/593
(58) Field of Search .................... 348/584, 586, 348/590, 591, 593, 594, 595, 597, 598, 599; H04N 9/74

(56) References Cited

U.S. PATENT DOCUMENTS

| | | | |
|---|---|---|---|
| 3,604,849 | 9/1971 | Skrydstrup | 178/6.8 |
| 3,941,925 | 3/1976 | Busch et al. | 178/6.8 |
| 4,205,346 | 5/1980 | Ross | 358/181 |
| 4,698,666 | 10/1987 | Lake, Jr. et al. | 358/22 |
| 4,751,579 | 6/1988 | Okunishi et al. | 358/183 |
| 4,758,892 | 7/1988 | Bloomfield | 358/183 |
| 4,764,809 | 8/1988 | Haycock et al. | 358/183 |
| 4,782,392 | 11/1988 | Haycock et al. | 358/183 |
| 4,805,022 | 2/1989 | Abt | 358/183 |
| 4,809,072 | 2/1989 | Pohl | 358/183 |
| 4,823,183 | 4/1989 | Jackson et al. | 358/22 |
| 4,853,784 | 8/1989 | Abt et al. | 358/181 |
| 4,855,834 | 8/1989 | Cawley et al. | 358/183 |
| 4,862,272 | 8/1989 | Karlock | 358/181 |
| 4,991,014 | 2/1991 | Takahashi et al. | 358/183 |
| 5,008,755 | 4/1991 | Brain | 358/183 |
| 5,027,213 | 6/1991 | Kamin | 358/183 |
| 5,046,165 * | 9/1991 | Pearman et al. | 348/590 |
| 5,109,280 | 4/1992 | Karlock | 358/181 |
| 5,181,100 | 1/1993 | Hodgson | 358/37 |
| 5,184,222 | 2/1993 | Yanagisawa | 358/183 |
| 5,185,666 | 2/1993 | Capitant et al. | 358/183 |
| 5,305,108 | 4/1994 | Trytko | 348/594 |
| 5,353,068 | 10/1994 | Moriwake | 348/585 |
| 5,412,479 | 5/1995 | Alig et al. | 348/594 |
| 5,416,529 | 5/1995 | Lake | 348/590 |
| 5,426,467 | 6/1995 | Moriwake et al. | 348/584 |
| 5,432,528 | 7/1995 | Ritter | 345/115 |
| 5,515,110 | 5/1996 | Alig et al. | 348/594 |
| 5,528,310 | 6/1996 | Peters et al. | 348/593 |
| 5,625,420 * | 4/1997 | Nakata et al. | 348/580 |
| 5,675,392 | 10/1997 | Nayebi et al. | 348/584 |
| 5,812,216 | 9/1998 | Peters et al. | 348/593 |
| 5,825,433 | 10/1998 | Yamada et al. | 348/584 |
| 5,905,539 | 5/1999 | Angell | 348/594 |

FOREIGN PATENT DOCUMENTS

| | | |
|---|---|---|
| 2 323 735 | 9/1998 | (GB) . |
| WO 98/46013 | 10/1998 | (WO) . |

* cited by examiner

*Primary Examiner*—Michael H. Lee
(74) *Attorney, Agent, or Firm*—Fish & Richardson P.C.

(57) ABSTRACT

Combining first and second video streams into a combined output video stream by using a gradient table listing gradient values for pixels in a video frame to address a look up table of key values, and combining pixel values of the first and second video streams based upon respective key values read from the look up table.

11 Claims, 3 Drawing Sheets

FIG. 7A

| LUT ADDRESS | WIPE VALUE |
|---|---|
| 55 | 0 |
| 56 | 0 |
| 57 | 100 |
| 58 | 100 |
| 59 | 100 |
| 60 | 100 |
| 61 | 100 |

FIG. 7B

| LUT ADDRESS | WIPE VALUE |
|---|---|
| 55 | 0 |
| 56 | 0 |
| 57 | 75 |
| 58 | 100 |
| 59 | 100 |
| 60 | 100 |
| 61 | 100 |

FIG. 7C

| LUT ADDRESS | WIPE VALUE |
|---|---|
| 55 | 0 |
| 56 | 0 |
| 57 | 50 |
| 58 | 100 |
| 59 | 100 |
| 60 | 100 |
| 61 | 100 |

FIG. 7D

| LUT ADDRESS | WIPE VALUE |
|---|---|
| 55 | 0 |
| 56 | 0 |
| 57 | 25 |
| 58 | 100 |
| 59 | 100 |
| 60 | 100 |
| 61 | 100 |

FIG. 7E

| LUT ADDRESS | WIPE VALUE |
|---|---|
| 55 | 0 |
| 56 | 0 |
| 57 | 0 |
| 58 | 100 |
| 59 | 100 |
| 60 | 100 |
| 61 | 100 |

FIG. 6

| LUT ADDRESS | VALUE |
|---|---|
| 37 | 30 |
| 38 | 32 |
| 39 | 35 |
| 40 | 38 |
| 41 | 42 |
| 42 | 46 |
| 43 | 50 |
| 44 | 55 |
| 45 | 60 |
| 46 | 65 |
| 47 | 72 |
| 48 | 79 |
| 49 | 86 |
| 50 | 94 |
| 51-100 | 100 |

EFFECTING VIDEO TRANSITIONS BETWEEN VIDEO STREAMS

BACKGROUND OF THE INVENTION

The invention relates to effecting video transitions between video streams.

In editing of video in the creation of a video program, it is often desirable to provide a gradual transition from one video stream to another video stream. For example, in a wipe transition, a line may move across the screen from left to right, with the old scene gradually disappearing at the right while more and more of the new scene appears at the left. In a so-called "iris wipe," the boundary is an expanding circle, and one video stream appears in an expanding circle, and the other is outside of the circle. A solid color could also be used as one stream to provide an image that gradually appears or disappears across the screen or an image that gradually expands or contracts.

Referring to FIG. 1, transitions can be created at a video combiner 10 having a first video input 12 for a first video stream, a second video input 14 for a second video stream, a key input 16 to receive key values indicating how the two inputs are to be combined, and a video output 18 for the output video that is some combination of the two inputs. The video streams include frames (each frame providing an image for a screen) made up of horizontal lines, each of which includes individual "pixels" (picture elements) across the line. Each pixel value includes a number of bit values that describe the color and intensity at that particular pixel at a particular time. New frames are provided at the video rate, e.g., 30 frames per second, and the video streams include sequential digital data describing sequential pixel values for lines of video data in a frame. The pixels for the first and second video streams that are input to combiner 10 are synchronized, as are the associated key values. The key value for a given pixel indicates whether the output for that pixel is the input from one stream or the other stream or a combination of the two.

While a unique key value could be stored and accessed for each pixel in each frame, to reduce bandwidth, a single table of gamma values (also referred to as gradient values herein) can be used. For example, a single table with one value for each pixel can be used to define the wipe over the sequence of frames. In the table, the gamma value essentially indicates the time at which the transition appears at that pixel. FIG. 2 is a simplified diagram of a table of gamma values 20 for an iris wipe of a square (instead of circular) transition. (A real table for NTSC would have 720 horizontal entries and 480 vertical entries.) As the time goes from frames 1 to 2 to 3 etc, a "threshold" value similarly goes from 1 to 2 to 3 etc (or 1, 1, 2, 2, 3, 3 or 1, 2, 3, 3, 4 to spread things out, though the latter example would not be uniform). The threshold is compared to the value in the table to determine the key value (e.g., a 0 key value meaning all of video stream A, a 100 key value meaning all of video stream B, and a 50 key value meaning equal amounts of A and B) that is fed to the mixer. The key values that are generated cause the video output to switch over from one video input to the other. As the threshold increases, the boundary of the transition provided by use of the FIG. 2 table expands. The following algorithm employs a direct comparison that provides an abrupt transition as the threshold goes from 0 to 4, as shown in displays 22, 24, 26, 28, 30 in FIGS. 3A–3E, respectively.

If (gradient<threshold)
   then wipe=transparent
else
   wipe=opaque

"Softness" can be added to the key values generated so that the change from one video to the other is not abrupt but instead is gradual (with decreasing amounts of one video stream and increasing amounts of another) in a discrete number of adjacent pixels as the transition passes a pixel location. For example, the following algorithm can be used to produce a gradual transition region N pixels wide.

If (gradient<(threshold−N) then
   wipe=transparent
else if (gradient>=(threshold−N) AND (gradient<threshold) then
   wipe=½ *opaque*(1−(threshold−gradient)/N)
else if (gradient>=threshold) AND (gradient<(threshold+N)) then
   wipe=½ *opaque*(1+(gradient−threshold)/N)
else if (gradient>=(threshold+N))
   wipe=opaque With this algorithm, the transition from one video stream to the other is linear, though the human eye sees brightness more as a cube root function. Also, the threshold may only be moved on integer pixel boundaries, which can cause abrupt changes in movement when the wipe moves X pixels in Y frames, and X and Y are not multiples of each other.

SUMMARY OF THE INVENTION

The invention features, in general, combining first and second video streams into a combined output video stream by using a gradient table listing gradient values for pixels in a video frame to address a look up table of key values, and combining pixel values of the first and second video streams based upon respective key values read from the look up table.

Particular embodiments of the invention may include one or more of the following features. The video is combined at a video combiner having an input for the first video stream, an input for the second video stream, an input for the key values, and a video output. New key values are loaded into the look up table between frames. The new values loaded into the look up table provide a nonlinear interpolation. The new values loaded into the look up table provide a transition over a noninteger number of pixels per frame. The new values loaded into the look up table provide nonlinear softness on the edges of the transition.

Embodiments of the invention may include one or more of the following advantages. Use of a look up table instead of thresholds permits one to create soft transitions that vary in other than a linear way. The look up table also permits one to move the transition boundary by less than one pixel at one time.

Other advantages of the invention will be apparent from the following description of a particular embodiment thereof and from the claims.

BRIEF DESCRIPTION OF THE DRAWINGS

FIG. 6 is a table providing an exponential mapping of gradient values into key values in the FIG. 4 system.

FIGS. 7A–7E are a sequence of tables showing a mapping of gradient values into key values that results in moving a transition over a distance other than an integer pixel in the FIG. 4 system.

DESCRIPTION OF THE PREFERRED EMBODIMENT

Figure 1:
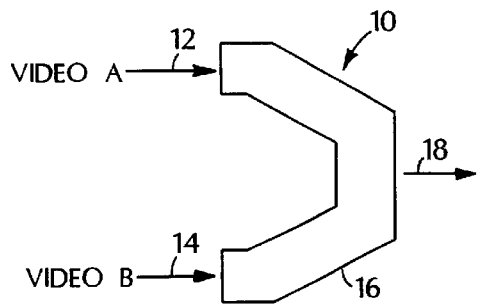
FIG. 1 is a block diagram showing a prior art video combiner for combining first and second video streams.
Figure 2:
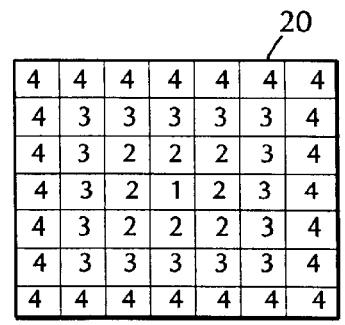
FIG. 2 is a diagram of a prior art table of gamma values used to generate key values for the FIG. 1 video combiner.
Figure 3A:
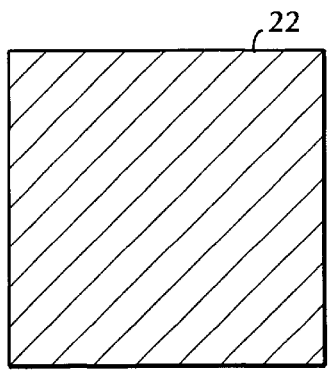
FIGS. 3A–3E are diagrams of sequential frames showing a transition resulting from the table of FIG. 2.
Figure 3B:
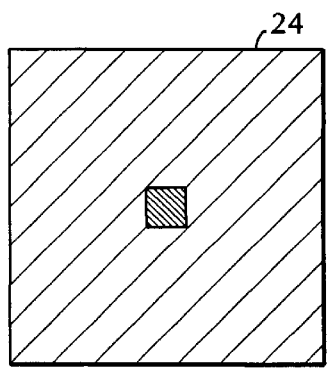
Figure 3C:
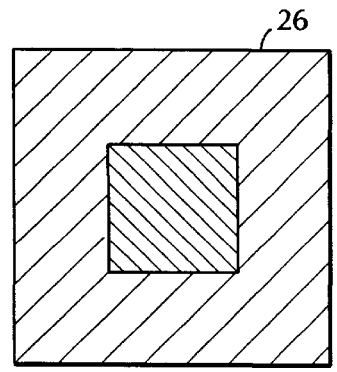
Figure 3D:
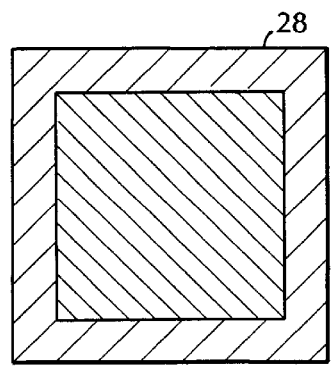
Figure 3E:
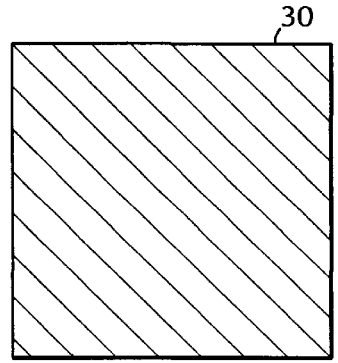
Figure 4:
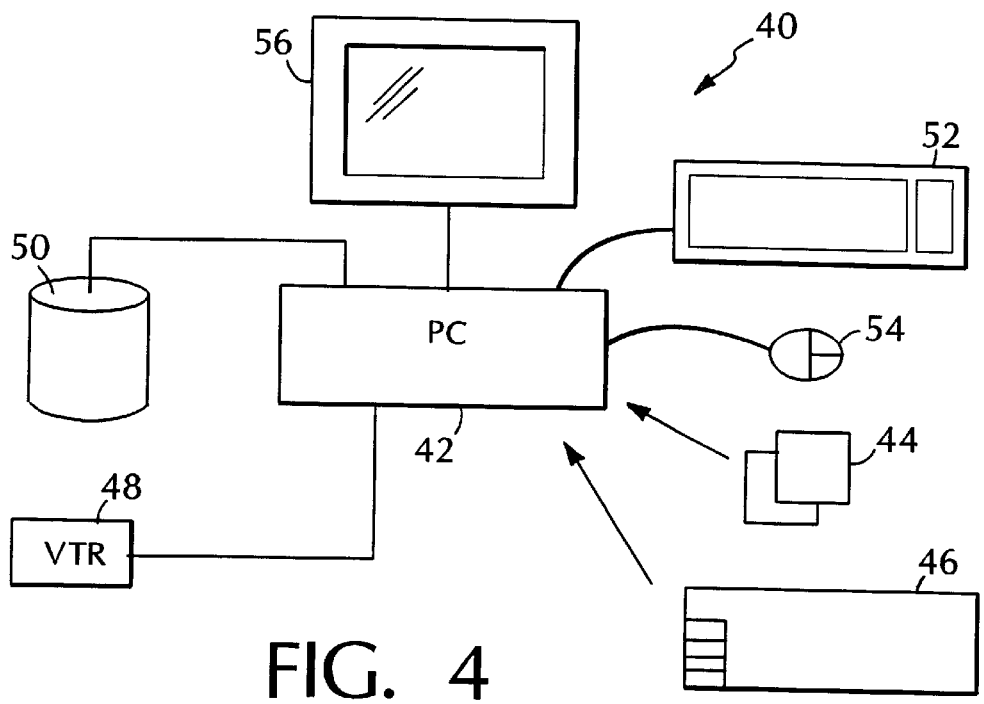
FIG. 4 shows a video editing system.

Referring to FIG. 4, video editing system 40 is implemented by computer 42, video editing software 44 running on computer 42, and video editing expansion card 46 plugged into computer 42. VTR 48 is a source of video streams that can be stored on disk or other mass storage 50 and randomly accessed by computer 42. Keyboard 52 and mouse 54 are user input devices, and monitor 56 is used to provide a video editing interface including display of a program being created. An additional monitor (not shown) can also be used to play the video program. U.S. Pat. Nos. 5,506,932; 5,488,695; 5,471,577; 5,909,250, which are hereby incorporated by reference, describe video editing systems implemented on a computer.

Figure 5:
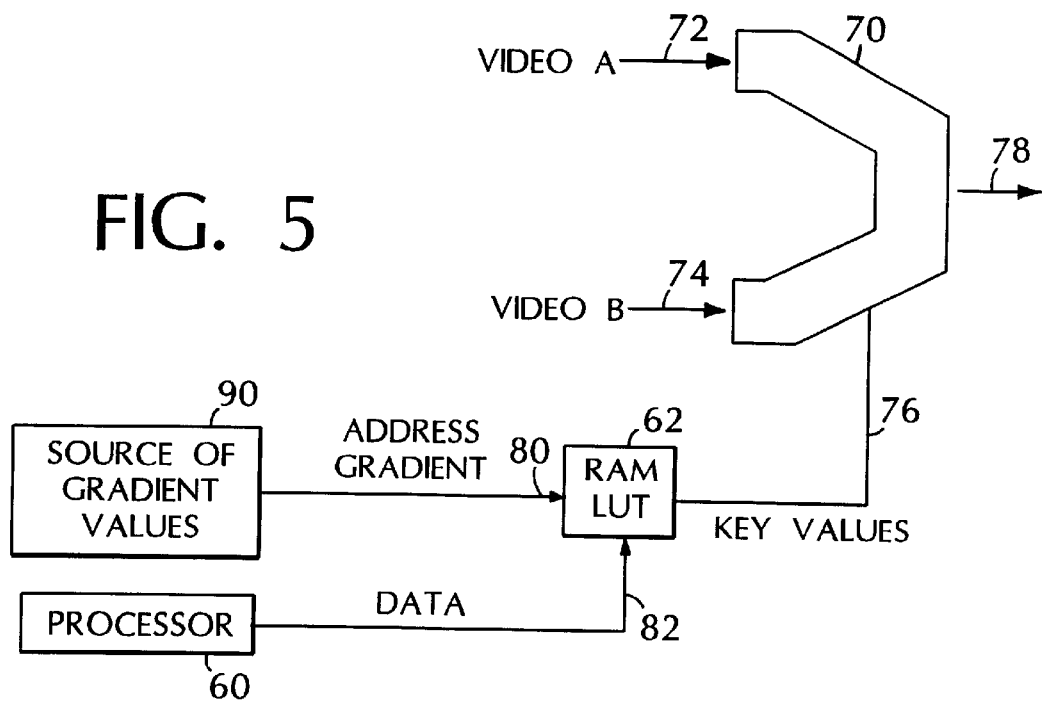
FIG. 5 shows some of the components of a video editing card used in the FIG. 6 system.

Referring to FIG. 5, video editing card 46 includes on-board microprocessor 60, random access memory look up table (RAM LUT) 62 and video combiner 70, which has first and second video inputs 72, 74, key input 76, and video output 78. RAM LUT 62 receives a stream of gradient values from source of gradient values 90 at address pins 80. Typically, source 90 would be a RAM storing the gradient table, and the RAM would be addressed with sequential addresses to generate a stream of gradient values. A new gradient value, for the next pixel in the frame, is inputted with each pixel clock at address pins 80 of RAM LUT 62. New data values from microprocessor 60 are inputted via data pins 82 into RAM LUT 62 between each frame.

In operation, RAM LUT 62 is used to provide a stream of key values to video combiner 70 in synchronization with the pixel values for video streams A and B being inputted to inputs 72 and 74. At each pixel clock, the pixel values for the next pixel in the line are inputted to first and second video inputs 72, 74, and the corresponding key value from RAM LUT 62 is input to key input 76. At each pixel clock a new gradient value is read from the gradient table and applied to the address pins 80 of RAM LUT 62, and at each pixel clock, a new key value is read from RAM LUT 62. The video streams A, B (FIG. 5) are delayed as necessary with respect to the gradient stream so that keys at key input 76 of video combiner 70 line up with respective pixel values at video inputs 72, 74 of video combiner 70. The video at output 78 is the combination of video A and B indicated by the key value. Between each frame, new key values are loaded into RAM LUT 62 by microprocessor 60.

While loading new key values into RAM LUT 62 is more computationally intensive than setting a threshold value, it is still significantly easier than generating the entire wipe every frame, and much of the temporal compression afforded by gradient wipes is still present. RAM LUT 62 can be loaded with any desired type of transition and is thus not limited to linear transitions as with the algorithm described above in the Background section. For example, at a threshold of 43, an exponential transition (0=all video A, 100=all video B) could be provided by the entries shown in the table of FIG. 6. While the table has been truncated, it still demonstrates a non-linear transition region.

RAM LUT 62 can also be used to move the transition by less than one pixel at a time or by a noninteger value. Consider the following simple case, a hard edge threshold at 57 to be moved to 59 over 4 frames. With a simple threshold (as described above in the Background section) one would need to repeat a threshold value in the sequence of four frames, e.g., use 57, 58, 58, 59 or 57, 57, 58, 59 or a similar sequence. Even with a method for adding softness to either side of the threshold (as described above in the Background section), the threshold itself may still only move an integer pixel every frame.

With RAM LUT 62, one can achieve a move from 57 to 58 over four frames using the entries in the tables in FIGS. 7A–7E. In essence, the transition can be moved one pixel over four frames. This example has two simplifications that are not limitations of the architecture. The example (FIGS. 7A–7E) does not have softness (as noted above, any softness, linear or other, can be added), and the interpolation method used is a simple linear interpolation (any desired temporal change can be employed by selection of the key values in the table).

The values of the tables can be generated on video editing card 46 or precomputed and stored on local memory on video editing card 46 and easily loaded into RAM LUT 62 between frames.

Other embodiments of the invention are within the scope of the appended claims.

What is claimed is:

1. A method of combining first and second video streams into a combined output video stream comprising providing a gradient table listing gradient values for pixels in a video frame made up of lines of pixels, each said gradient value relating to a time at which a transition crosses said pixel, said transition being from said first video stream to said second video stream, reading gradient values for sequential said pixels from said table, using said gradient values to address a look up table of key values, reading out key values addressed by said gradient values, and combining pixel values of said first and second video streams based upon respective said key values.

2. The method of claim 1 wherein said combining is carried out at a video combiner having an input for said first video stream, an input for said second video stream, an input for said key values, and a video output.

3. The method of claim 1, further comprising loading new values into said look up table between frames.

4. The method of claim 3 wherein said new values loaded into said look up table provide a nonlinear interpolation.

5. The method of claim 3 wherein said new values loaded into said look up table provide a transition over a noninteger number of pixels per frame.

6. The method of claim 3 wherein said new values loaded into said look up table provide nonlinear softness on the edges of said transition.

7. Apparatus for combining first and second video streams into a combined output video stream comprising circuitry providing sequential gradient values from a gradient table listing gradient values for pixels in a video frame made up of lines of pixels, each said gradient value relating to a time at which a transition crosses said pixel, said transition being from said first video stream to said second video stream, a random access memory look up table (RAM LUT) of key values that is connected to be addressed by said sequential gradient values of said gradient table, and a video combiner connected to receive said key values read from said RAM LUT and having inputs for first and second video streams, said combiner combining pixel values of said first and second video streams based upon respective said key values.

8. The apparatus of claim 7 further comprising a processor that loads new values into said RAM LUT between frames.

9. The apparatus of claim 8 wherein said processor loads new values into said RAM LUT to provide a nonlinear interpolation.

10. The apparatus of claim 8 wherein said processor loads new values into said RAM LUT to provide a transition over a noninteger number of pixels per frame.

11. The apparatus of claim 8 wherein said processor loads new values into said RAM LUT to provide nonlinear softness on the edges of said transition.

* * * * *